United States Patent
Schuhmann et al.

(10) Patent No.: US 10,507,632 B2
(45) Date of Patent: Dec. 17, 2019

(54) PACKAGING FILM

(71) Applicant: INFIANA GERMANY GMBH & CO.KG, Forchheim (DE)

(72) Inventors: Michael Schuhmann, Großhabersdorf (DE); Stefan Sitzmann, Kirchehrenbach (DE); Larissa Zirkel, Erlangen (DE); Harald Gerlacher, Memmelsdorf (DE); Werner Schmidt, Forchheim (DE)

(73) Assignee: INFIANA GERMANY GMBH & CO. KG, Forchheim (DE)

( * ) Notice: Subject to any disclaimer, the term of this patent is extended or adjusted under 35 U.S.C. 154(b) by 109 days.

(21) Appl. No.: 15/877,587

(22) Filed: Jan. 23, 2018

(65) Prior Publication Data

US 2018/0147821 A1    May 31, 2018

Related U.S. Application Data

(63) Continuation of application No. PCT/EP2016/001296, filed on Jul. 27, 2016.

(30) Foreign Application Priority Data

Jul. 28, 2015 (DE) .......... 10 2015 009 546
Jul. 28, 2015 (DE) .......... 10 2015 017 119

(51) Int. Cl.
| | |
|---|---|
| *B32B 27/32* | (2006.01) |
| *B32B 7/06* | (2019.01) |
| *B32B 27/28* | (2006.01) |
| *B32B 7/12* | (2006.01) |
| *C08L 23/06* | (2006.01) |
| *C08L 23/14* | (2006.01) |
| *C09J 123/06* | (2006.01) |
| *C09J 123/14* | (2006.01) |
| *C09J 183/04* | (2006.01) |

(52) U.S. Cl.
CPC .......... *B32B 27/32* (2013.01); *B32B 7/06* (2013.01); *B32B 7/12* (2013.01); *B32B 27/283* (2013.01); *C08L 23/06* (2013.01); *C08L 23/14* (2013.01); *C09J 123/06* (2013.01); *C09J 123/14* (2013.01); *C09J 183/04* (2013.01); *B32B 2255/26* (2013.01); *B32B 2307/54* (2013.01); *B32B 2307/582* (2013.01); *B32B 2323/046* (2013.01); *B32B 2323/10* (2013.01); *B32B 2383/00* (2013.01); *B32B 2555/02* (2013.01); *C08F 2500/08* (2013.01); *C08L 2203/16* (2013.01); *C09J 2423/005* (2013.01)

(58) Field of Classification Search
USPC .................................. 428/337, 516
See application file for complete search history.

(56) References Cited

U.S. PATENT DOCUMENTS

| | | | |
|---|---|---|---|
| 8,940,369 B2 | 7/2015 | Fürst et al. | |
| 2007/0082191 A1* | 4/2007 | Liang | B32B 27/32 428/335 |
| 2013/0189436 A1 | 7/2013 | Fürst et al. | |
| 2013/0260122 A1* | 10/2013 | Siu | B65D 53/08 428/220 |
| 2014/0014546 A1 | 1/2014 | Sitzmann et al. | |
| 2017/0001422 A1 | 1/2017 | Bauernfeind | |

FOREIGN PATENT DOCUMENTS

| | | |
|---|---|---|
| DE | 10 2011 012209 A1 | 8/2012 |
| DE | 10 2011 086386 A1 | 11/2012 |
| DE | 10 2014 003886 A1 | 9/2015 |
| DE | 10 2014 010691 A1 | 9/2015 |
| EP | 2611609 A1 | 7/2013 |
| WO | 2005/065945 A1 | 7/2005 |
| WO | 2012/113535 A1 | 8/2012 |

OTHER PUBLICATIONS

International Search Report dated Oct. 13, 2016, dated Nov. 2, 2016.
English Translation of International Search Report dated Oct. 13, 2016, dated Nov. 2, 2016.

* cited by examiner

*Primary Examiner* — Fred M Teskin
(74) *Attorney, Agent, or Firm* — The Dobrusin Law Firm, P.C.

(57) ABSTRACT

A packaging film suitable for an outer packaging composed of an optionally release-capable, upstretched, at least monolaminar polyolefin film comprising a) a layer (a) based on a mixture of α) 20-49% by weight of a polypropylene or of at least one propylene copolymer, or combination thereof, and of β) 80-51% by weight of at least one polyethylene or ethylene copolymer, and optionally γ) customary auxiliaries, with a layer thickness of ≤20 μm, on at least one surface of the layer (a) a release coating (b) composed of cured polysiloxane, wherein the tensile strength of the polyolefin film in machine direction is at least 6.5 N/cm, measured according to DIN EN ISO 527-3, and outer packagings produced therefrom.

14 Claims, No Drawings

PACKAGING FILM

This application is a Continuation of International Patent Application No. PCT/EP2016/001296, filed Jul. 27, 2016, which claims foreign priority benefit under 35 U.S.C. § 119 of German Patent Applications 10 2015 009 546.3, filed Jul. 28, 2015, and 10 2015 017 119.4, filed Jul. 28, 2015, the contents of which are incorporated herein by reference.

The present invention relates to a packaging film suitable for a wrapper composed of an optionally releasable, unstretched, at least single-layer polyolefin film, comprising a) a layer (a) based on a mixture of α) from 20 to 49% by weight of a polypropylene and/or of at least one propylene copolymer and of β) from 80 to 51% by weight of at least one polyethylene and/or ethylene copolymer, preferably with melting point of at least 113° C. and optionally of γ) conventional auxiliaries, preferably processing auxiliaries, with layer thickness of ≤20 μm, preferably from 6 to ≤20 μm, and b) optionally on at least one surface of the layer (a) a release coating (b) composed of cured polysiloxane and c) optionally on at least one uncovered surface of the layer (a) an optionally sealable layer (c) made of a thermoplastic polymer with melting point lower by at least 5° C. than the melting point of the layer (a), wherein the tensile strength of the polyolefin film in machine direction is at least 6.5 N/cm, measured in accordance with DIN EN ISO 527-3, and to wrappers produced therefrom for preferably individually packed hygiene products or individually packed incontinence products, which optionally have self-adhesive properties.

BACKGROUND OF THE INVENTION

It is known that plastics films are used for many applications, and that the use of plastics films as packaging material makes up a considerable proportion thereof. In the hygiene sector in particular there is also an increasing trend toward packing of hygiene items for single use, because hygiene items such as panty liners or sanitary napkins, and also incontinence items, are increasingly individually packed. Therefore, there is also an accelerating increase in requirement for corresponding packaging material. Because this packaging material has little capability for recycling and therefore cannot be reused, attempts are increasingly being made to minimize use of fossil resources for these packaging materials. The intention is therefore that the production of corresponding plastics films as packaging material uses the smallest possible quantity of polymers obtained from fossil feed resources, while avoiding any reduction of the indispensable quality requirements of such plastics films, in particular of their mechanical properties and other necessary physical properties.

It is obvious for saving polymer material during the production of plastics films to reduce the total thickness of these multilayer plastics films. However, since this is usually associated with impairment, sometimes drastic impairment, of the mechanical properties of these plastics films, for example of the tensile strength, the tear-propagation resistance and sometimes also the puncture resistance, the handling of the plastics films during the further processing to give the final product becomes more difficult and can cause production problems. This method of saving material is therefore associated with considerable risks. In addition, difficulties can also occur during the application of a release coating or of an adhesive on the plastics films with total thickness 20 μm, mostly because they have inadequate thermal stability.

SUMMARY

It was therefore an object of the present invention to provide a packaging film which is based on a flexible plastics film and which, despite reduction of the total thickness of the plastics film to less than 20 μm, has excellent mechanical and adequate thermal properties and ensures very substantially problem-free processing.

This object is solved by the provision of a packaging film suitable for a wrapper composed of an optionally releasable, unstretched at least single-layer polyolefin film, comprising a) a layer (a) based on a mixture of α) from 20 to 49% by weight of a polypropylene and/or of at least one propylene copolymer and of β) from 80 to 51% by weight of at least one polyethylene and/or ethylene copolymer, preferably with melting point of at least 113° C. and optionally of γ) conventional auxiliaries, preferably processing auxiliaries, with layer thickness of 20 μm, preferably from 6 to 20 μm, and particularly preferably from 6 to 18 μm, and b) optionally on at least one surface of the layer (a) a release coating (b) composed of cured polysiloxane and c) optionally on at least one uncovered surface of the layer (a) an optionally sealable layer (c) made of a thermoplastic polymer with melting point lower by at least 5° C. than the melting point of the layer (a), wherein the tensile strength of the polyolefin film in machine direction is at least 6.5 N/cm, measured in accordance with DIN EN ISO 527-3.

The VICAT temperature of the polymer component α) of the layer (a) mat be at least 130° C., preferably at least 140° C., particularly preferably at least 150° C., measured by method A50 at 50° C./10 N (i.e, ASTM D1525-00, Loading 1 of 10±0.2 N, and Rate A of 50±5° C./min).

In a preferred embodiment, the inventive polyolefin film consists only of a single-layer plastics film with total thickness of ≤20 μm, preferably from 6 to ≤20 μm, particularly preferably from 6 to 18 μm, layer (a) of which preferably has, on at least one of its surfaces, a release coating (b) composed of a cured polysiloxane, wherein the tensile strength of the plastics film in machine direction is at least 6.5 N/cm, measured in accordance with DIN EN ISO 527-3.

According to another preferred embodiment, the inventive packaging film can be a multilayer, preferably at least two-layer, film.

According to this preferred embodiment, the inventive packaging film consists of a multilayer polyolefin film with an at least two-layer structure made of the layer (a) which optionally has a release coating (b) on one surface and, on its other surface, a layer (c) which optionally is sealable.

Because the thickness of the release coating is at most from 1 to 2 μm, the coating is not counted as a layer.

According to another preferred embodiment, the inventive packaging film can be based on a 3-layer polyolefin film, layer (a) of which has on each of its surfaces, a layer (c) based on a polyolefin or olefin copolymer and each of which has a thickness of ≥4 μm and optionally has a release coating at least on one of the layers (c).

DETAILED DESCRIPTION

It is preferable that the inventive packaging film consists of at least 95% by weight of $C_2$-$C_8$-olefin polymers, a mixture thereof, or copolymers in the respective olefin proportions or mixture ratios stated before, thus enabling provision of polyolefin films with the features mentioned before, e.g. thickness, tensile strength, and optionally tear-propagation resistance, and thermal stability.

The inventive polyolefin film comprises no cyclic olefin polymers or cyclic olefin copolymers, and also no butylene homopolymer or butylene copolymer. The film is unstretched.

The inventive packaging film also comprises no metal layer, i.e. no metal foil and no metal layer applied by electrode atomization.

It is preferable that the layer (a), and also the optionally present layer (c), or the layers (c), of the inventive polyolefin film are respectively based on polyolefins and/or olefin copolymers of $\alpha,\beta$-unsaturated olefins having from 2-8 carbon atoms. The polyolefins are preferably selected from the group comprising polyethylenes (PE), preferably polyethylenes of low density from 0.86 to 0.93 g/cm$^3$ (LDPE), linear polyethylenes of low density from 0.86 to 0.94 g/cm$^3$ (LLDPE) which can comprise one or more $\alpha$-olefins having from 4 to 8 carbon atoms as comonomer alongside ethylene, polyethylenes of medium density from 0.926 to 0.94 g/cm$^3$ (MDPE), polyethylenes of high density from 0.94 to 0.97 g/cm$^3$ (HDPE), or ethylene copolymers polymerized by metallocene catalysis with an $\alpha$-olefin having from 4 to 8 carbon atoms, preferably 6 and/or 8 carbon atoms (mPE); polypropylenes (PP) or propylene-ethylene copolymers with preferably up to 20% by weight of ethylene. Preference is given, as mixture component $\beta$), to a mixture component made of LLDPE, MDPE, HDPE, or to a mixture of LDPE with LLDPE, MDPE or HDPE for the production of the layer (a) in a quantity of from 80 to 51% by weight, preferably from 75 to 55% by weight, particularly preferably from 70% by weight to 60% by weight, based on the total weight of the mixture of $\alpha$) and 13), the melting point of which is preferably at least 113° C.

In a preferred mixture component (3), the proportion of the LDPE is $\leq$85% by weight, preferably from 10 to 85% by weight, and the proportion of the LLDPE, MDPE or HDPE is $\geq$15% by weight, preferably from 90 to 15% by weight, LLDPE preferably being used as mixture component in order to achieve a melting point of at least 113° C.

Accordingly preferred mixtures of this type of mixture component (3) with a mixture component $\alpha$) listed thereafter preferably give, as layer a), a packaging film with tear-propagation resistance at least 0.18 N in MD, measured in accordance with DIN 53356.

The mixture of which the layer (a) is composed comprises, as mixture component $\alpha$), from 20 to 49% by weight, preferably from 25 to 45% by weight, particularly preferably from 30 to 40% by weight, based on the total weight of the mixture, of at least one polypropylene or propylene copolymer. Materials preferably suitable as polypropylene are isotactic propylene homopolymers with melting point from 140 to 170° C., preferably from 150 to 165° C. Materials used as propylene copolymers can moreover be at least one copolymer of propylene and up to 20% by weight, preferably 10% by weight, based on the copolymer, of ethylene as mixture component $\alpha$).

The layer (c) which can optionally be present on at least one surface of the layer (a) preferably consists of at least one layer composed of a polyolefin, particularly preferably of at least one polyethylene and/or ethylene copolymer, where the melting point of a sealable layer (c) must be lower by at least 5° C. than the melting point of the layer (a).

According to a preferred embodiment, the optionally present layer (c) or the layers (c), being identical or different, consist(s) of the polymer component (3) of the polymer mixture of which the layer (a) is composed.

The layer(s) of the inventive polyolefin film can respectively comprise the same or different additives and, respectively, auxiliaries selected from the group comprising antioxidants, antiblocking agents, antifogging agents, antistatic agents, antimicrobial ingredients, light stabilizers, UV absorbers, UV filters, dyes, color pigments, stabilizers, preferably heat stabilizers, process stabilizers and UV stabilizers and/or light stabilizers, preferably based on at least one sterically hindered amine (HALS), processing auxiliaries, flame retardants, nucleating agents, crystallization agents, preferably crystal-nucleating agents, lubricants, optical brighteners, plasticizers, silanes, spacers, fillers, for example $CaCO_3$, silicates, peel additives, sealing additives, waxes, wetting agents, surface-active compounds, preferably surfactants, and dispersing agents.

The layers of the plastics film used in the invention can comprise at least from 0.01 to 15% by weight, preferably at least from 0.1 to 10% by weight, based in each case on the total weight of an individual layer, of at least one of the abovementioned additives.

The thickness of each of the layers (c), if present, can, being identical or different, be 4 μm, preferably from 4 to 10 μm.

The inventive packaging film can also, in order to improve its release effect, have a release coating (b) on one of its surfaces or on one of its external layers.

It is preferable that the release coating (b) is based on a cured polysiloxane coating which is applied on at least one surface of the inventive packaging film essentially over the entire surface, preferably with the exception of at least one strip running in machine direction, or part of the surface, preferably in the form of transverse strips in precise register.

For the purposes of the present invention, the term "polysiloxane" means compounds of which the polymer chains are composed of silicon atoms and oxygen atoms in alternation. A polysiloxane is based on n repeating siloxane units $(-[Si(R_2)-O]-)_n$, which respectively mutually independently have disubstitution by two organic moieties R, where R is preferably respectively $R^1$ or $OR^1$ and $R^1$ is respectively an alkyl moiety or an aryl moiety. It is preferable that the cured polysiloxane coating is based on a repeating dialkylsiloxane unit or on a repeating alkylarylsiloxane unit. These units can be classified in accordance with the number of Si—O bonds possessed by an individual siloxane unit, based in each case on a tetravalent silicon atom, as terminal monofunctional siloxanes (M) having one Si—O bond, difunctional siloxanes (D) having two Si—O bonds, trifunctional siloxanes (T) having three Si—O bonds, and tetrafunctional siloxanes (Q) having four Si—O bonds. It is preferable that the polysiloxane coating of the invention has a crosslinked ring structure or crosslinked chain structure, particularly a crosslinked chain structure linked via (D), (T), and/or (Q) units to give a two- or three-dimensional network. The number n of repeating siloxane units $[Si(R_2)-O]-)_n$ in the polysiloxane chain is termed the degree of polymerization of the polysiloxane.

The cured polysiloxane coating (b) of the inventive packaging film is preferably based on at least one cured, i.e. crosslinked polysiloxane selected from the group comprising addition-crosslinked, preferably metal-catalyzed-addition-crosslinked, condensation-crosslinked, free-radical-crosslinked and/or cationically crosslinked polysiloxanes.

It is particularly preferable that the polysiloxane coating is based on at least one cured polysiloxane cured by thermal curing and/or by exposure to UV radiation. It is preferable that the polysiloxane coating (b) is based on at least one cured polysiloxane selected from the group comprising polydialkylsiloxanes, preferably polydimethylsiloxanes, and polyalkylarylsiloxanes, preferably polymethylphenylsiloxanes which respectively have been cured. Thermally cured polysiloxanes can be obtained via thermal hydrosilylation of polysiloxanes having silane functions with a compound having at least one carbon double bond. UV hardening takes place, as does thermal curing, after the production of the packaging film of the invention, preference being given in the invention to UV curing here.

The packaging film of the invention can in principle be produced by known production processes, for example by extrusion or by coextrusion.

The single-layer polyolefin film, or individual layers, or else all of the layers, of the multilayer, inventive polyolefin film can be produced via extrusion, in particular blown-film extrusion and/or flat-film extrusion (cast extrusion), or coextrusion, preferably blow-film coextrusion and/or flat-film coextrusion (cast coextrusion), preference being given here to blown-film (co)extrusion. A factor requiring consideration here is that in the event of addition of additives to the layer (a) or to the other layers optionally present, these can be processed via blending, optionally in the form of masterbatch, with the polymer component(s) of the respective layer. This blending can be dry pellet/powder blending or dry pellet/pellet blending. However, it is also possible to add the additive to the molten polymer component(s) of the respective layer, preferably via dosing into the material in an extruder used for the extrusion of the respective layer.

In the case of production via extrusion, the single-layer polyolefin film, or the melts corresponding to the individual layers of the inventive polyolefin film, simultaneously and together, is/are (co)extruded through an annular die or a flat-film die, and if an annular die is used the resultant film is air-blown and cooled, and if a flat-film die is used the resultant film is drawn off for solidification with the aid of rolls and cooled.

A release coating can then be applied onto at least one surface of the inventive polyolefin film, optionally after intermediate storage.

The inventive packaging film can have been embossed and can have a single-side embossment structure on one of its surface layers, or can have an embossment structure throughout the film, with a corresponding male and female side.

The embossment of the inventive packaging film can be produced in-line on one side in the flat-film extrusion process. In this case, the polymer melt is cast through the die gap onto a structured, chilled roll and molded by means of counter-rolls to give a film. The structured roll transfers its structure only onto one of the sides of the film.

The embossment of the inventive packaging film can be produced in-line throughout the film in the blown-film extrusion process. In this case, the film is heated and then drawn through an embossing gap between a structured chilled steel roll and an unstructured rubber roll. The steel roll transfers its structure to the steel-roll side of the film, and by virtue of the resilient rubber roll on the counterside, on the rubber-roll side, a negative structure of the steel-roll structure is replicated.

The embossment of the inventive packaging film can also be produced off-line throughout the film after the blown-film extrusion process or flat-film extrusion process. In this case, in a further step, the film is heated and then drawn through an embossing gap between a structured, chilled steel roll and an unstructured rubber roll. The steel roll transfers its structure to the steel-roll side of the film, and by virtue of the resilient rubber roll on the counterside, on the rubber-roll side, a negative structure of the steel-roll structure is replicated.

The structure to be embossed is produced by the conventional processes known to the person skilled in the art, and specific processes can be particularly advantageous here for particular structures and materials. In principle, the structures on the embossing roll can be continuous structures or discontinuous structures (sequence of individual embossment structures), and a combination of the two structures is also possible here. The respective structures on the embossing roll can have a very wide variety of geometric shapes, depending on the intended (asymmetric) structure of the plastics film. Preference is given to a regular structure here.

The unstretched inventive packaging film moreover has excellent tensile strength, good to very good tear-propagation behavior, and excellent heat resistance, and low shrinkage.

The heat resistance of the inventive polyolefin film preferably leads to shrinkage of the polyolefin film in MD and, respectively, CD measured in accordance with DIN 55543-4 for 100° C. and 1 min in the oil bath of respectively 10%, preferably 8%.

It is thus possible, despite low total layer thickness, to achieve the necessary application of molten adhesive in precise register onto the inventive packaging film, to carry out the release-coating process and, without any significant difficulty, to achieve further processing with the usual high processing speeds of packaging machinery.

The present invention therefore further provides the use of the inventive packaging film as optionally peelable release film or protective film, preferably for items of any type, particularly preferably for items of any type having self-adhesive properties.

The present invention further provides the use of the inventive packaging film as peelable film for the packaging and/or protection of self-adhesive labels or of adhesive tapes of any type, in particular in the construction industry.

A particularly preferred use of the inventive polyolefin film is the use as preferably peelable film for the packaging and/or protection of hygiene items, preferably individually packed, optionally folded panty liners, sanitary napkins or incontinence items, where these optionally have self-adhesive properties. Accordingly the inventive polyolefin film takes the form of a preferably peelable wrapper, preferably for the cited hygiene items, possibly with self-adhesive properties, preferably sanitary napkins, panty liners or incontinence items, where these have preferably been individually packed in the wrapper of the invention.

To this end, the optionally peelable, flexible, inventive packaging film provides the concomitant advantage that it can be used to produce packaging that provides quiet handling, in particular individually packed hygiene products. The noise generated during handling here is ≤60 [db], measured as equivalent continuous sound pressure level $L_{eq}$ [db].

A. Measurement of Noise Emitted

The equivalent continuous sound level is determined by fixing a DIN A5 film sample centrally and horizontally on each long side with the aid of a clasp device. One of the clasp devices is immobile, while the other device can be moved on an eccentric path in order to generate noise by continual compression and stretching of the film sample. The rotation rate of the eccentric drive during the test is 36 rpm. The equivalent continuous sound level $L_{eq}$ [db] is determined, as noise emission parameter, with the aid of sound recording equipment which records the noise during continual compression and stretching of the film sample over a period of 30 seconds at a distance of 30 cm from the center of the longer side of the DIN A5 film sample. The film sample must remain undamaged during the stretching and compression procedure. The test equipment used is the 2250-L from Brüel & Kjaer.

B. Shrinkage Measurement Method

Shrinkage is measured in accordance with DIN 55543-4. In each case, therefore, ten samples measuring 100 mm×100 mm, in each case with marked direction of running in machine direction and, respectively, perpendicularly to machine direction, are placed in a bath of high-boiling-point oil at 100° C., in each case for 1 min, the respective average value for length change in MD and, respectively, in CD is calculated from the respective ten samples, and the respective change is stated as % shrinkage.

C. Tensile Strength Measurement

Tensile strength was determined in machine direction (MD) and perpendicularly to machine direction (CD) in accordance with DIN EN ISO 527-3 (with appropriate modification) for each monofilm (single-layer film) produced from the polymer mixtures stated in Table II A and, respectively, B and in each case 4.7% by weight of conventional processing auxiliaries.

Maximal force in N was determined, and converted to the unit N/cm, for a sample width of 25 mm with a test velocity of 500 mm/min.

D. Thickness Measurement

The thickness of the respective monofilm was measured in accordance with DIN 53370, and is stated in the form of an average value.

E. Measurement of Tear Propagation Resistance

The tear-propagation resistance of each monofilm was measured in accordance with DIN 53 356, a sample of size 100 mm×50 mm being tested here with a test velocity of 300 mm/min over a test length of 30 mm, and the initial values were ignored for evaluation purposes. Tear-propagation resistance was determined in machine direction (MD) and also perpendicularly to machine direction (CD).

The values determined in machine direction (MD) and also perpendicularly to machine direction (CD), both for tensile strength and for tear-propagation resistance, are stated in Tables IIA and IIB below in each case for the corresponding polymer mixture from which the monofilm was produced.

I. Chemical Characterization of the Raw Materials Used:

TABLE I

| Name | Description | Melting point Tm [° C.] | Vicat Tm [° C.] | Density [g/cm³] |
|---|---|---|---|---|
| LDPE | Low-density polyethylene | 111 | | 0.923 |
| LLDPE I | Metallocene ethylene-hexene copolymer | 114 | | 0.92 |
| LLDPE II | Metallocene ethylene-hexene copolymer | 119 | | 0.927 |
| MDPE | Medium-density polyethylene | 127 | | 0.935 |
| HDPE | High-density polyethylene | 132 | | 0.946 |
| PP homopolymer | Propylene homopolymer | 164 | 150 | 0.9 |
| PP copolymer | Propylene/Ethylene copolymer having 15% by weight of ethylene | 163 | 155 | 0.9 |
| Additives | Processing auxiliary | | | |

II: Production of Polyolefin Films (B) of the Invention and of Comparative Films The polymer mixtures listed in Tables IIA and IIB below, made of various polyethylenes or polyethylene mixtures and of a respectively identical polypropylene (PP homopolymer) or propylene/ethylene copolymer (PP copolymer) were used in the mixing ratios listed in Table II in a conventional blown-film extrusion process to produce the single-layer films (monofilms), in each case with identical thickness of 16 μm. Tables IIA and IIB also state the mixing ratios as percentages by weight, based on the entire mixture. Each mixture comprised 4.7% by weight, based on the entire mixture, of conventional processing auxiliaries.

TABLE IIA

| | PE | | PP homo-polymer | Tensile strength [N/cm] | | Tear-propagation resistance [N] | |
|---|---|---|---|---|---|---|---|
| Type | | % by weight | % by weight | MD | CD | MD | CD |
| Comp | LDPE | 90.5 | 4.8 | 5.04 | 3.04 | 0.1 | 1.32 |
| Comp | LDPE | 80.5 | 14.8 | 5.64 | 3.20 | 0.07 | 1.60 |
| Comp | LDPE | 65.3 | 30.0 | 6.46 | 3.48 | 0.14 | 1.32 |
| Inv | LDPE | 55.3 | 40.0 | 7.04 | 8.80 | 0.17 | 0.60 |
| Comp | LLDPE I | 80.5 | 14.8 | 5.92 | 5.44 | 0.52 | 2.25 |
| Inv | LLDPE I | 65.3 | 30.0 | 8.65 | 4.84 | 0.48 | 2.48 |
| Comp | LLDPE II | 80.5 | 14.8 | 5.36 | 4.24 | 0.68 | 2.26 |
| Inv | LLDPE II | 65.3 | 30.0 | 7.24 | 4.44 | 0.46 | 2.34 |
| Inv | HDPE | 75.3 | 20.0 | 7.88 | 3.64 | 0.87 | 3.61 |
| Inv | HDPE | 65.3 | 30.0 | 9.52 | 4.32 | 0.67 | 3.64 |

Comp = comparative example
Inv = inventive example

TABLE IIB

| | PE | | PP copolymer | Tensile strength [N/cm] | | Tear-propagation resistance [N] | |
|---|---|---|---|---|---|---|---|
| Type | | .% by weight | % by weight | MD | CD | MD | CD |
| Comp | LDPE | 90.5 | 4.8 | 5.04 | 2.64 | 0.14 | 1.28 |
| Comp | LDPE | 80.5 | 14.8 | 5.08 | 3.08 | 0.12 | 1.56 |
| Inv | LDPE | 65.3 | 30.0 | 6.64 | 4.20 | 0.15 | 1.47 |
| Inv | LDPE | 55.3 | 40.0 | 6.92 | 4.32 | 0.10 | 1.78 |
| Comp | LLDPE I | 80.5 | 14.8 | 6.28 | 4.48 | 0.57 | 1.94 |
| Inv | LLDPE I | 65.3 | 30.0 | 7.64 | 4.56 | 0.56 | 2.36 |
| Inv | LLDPE II | 75.3 | 20.0 | 7.20 | 3.60 | 0.67 | 2.39 |
| Inv | LLDPE II | 65.3 | 30.0 | 8.52 | 4.04 | 0.49 | 2.65 |
| Inv | HDPE | 75.3 | 20.0 | 8.80 | 4.20 | 0.97 | 3.56 |
| Inv | HDPE | 65.3 | 30.0 | 9.36 | 4.28 | 0.40 | 1.03 |

Comp = comparative example
Inv = inventive example

III. Results

The results listed in Tables IIA and IIB show that the use of mixtures comprising a component β) based on polyethylenes and/or ethylene copolymers with melting point ≥113° C. in mixture ranges of the invention with a component α) comprising polypropylene or propylene copolymers lead to packaging films with tensile strength ≥6.5 N/cm and with tear-propagation resistance preferably ≥0.18 in machine direction. It was moreover found that the noise produced by these monofilms during the handling of a wrapper produced of these packaging films was only ≤60 decibels. The packaging films moreover exhibit a heat resistance that is sufficiently high to permit problem-free coating with hot adhesive, as proven by the shrinkage values of ≤10% in MD and, respectively, CD measured by the stated method.

What is claimed is:

1. A wrapper made of an unstretched at least single-layer polyolefin film which optionally has release properties, comprising
   a) a layer (a) with thickness from 6 to ≤20 μm,
      based on a mixture of α) from 20 to 49% by weight of a polypropylene or of at least one propylene copolymer, or of a combination thereof, and
      of β) from 80 to 51% by weight of at least one polyethylene or ethylene copolymer, or of a combination thereof, and
      optionally of γ) conventional auxiliaries,
      wherein the α) component has a VICAT temperature of at least 130° C., as measured by ASTM D 1525-00, Rate A (50° C./min), Loading 1 (10 N), and
   b) optionally on at least one surface of the layer (a) a release coating (b) made of cured polysiloxane and
   c) optionally on at least one uncovered surface of the layer (a) an optionally sealable layer (c) with thickness from 4 to 10 μm made of a thermoplastic polymer with melting point lower by at least 5° C. than the melting point of the layer (a),
      wherein the tensile strength of the polyolefin film in machine direction is at least 6.5 N/cm, measured in accordance with DIN EN ISO 527-3.

2. The wrapper as claimed in claim 1, wherein the layer (a) of the polyolefin film is based on a mixture of from 25 to 45% by weight of the polymer component α) and from 55 to 75% by weight of the polymer component β), based in each case on 100% by weight of the mixture.

3. The wrapper as claimed in claim 1, wherein the VICAT temperature of the polymer component α) of the layer (a) of the polyolefin film is at least 140° C., as measured by ASTM D 1525-00, Rate A (50° C./min), Loading 1 (10 N).

4. The wrapper as claimed in claim 1, wherein the layer (a) of the polyolefin film comprises, as polymer component α), at least one propylene copolymer.

5. The wrapper as claimed in claim 1, wherein the layer (a) of the polyolefin film comprises, as polymer component β), at least one polyethylene selected from the group consisting of low-density polyethylenes (LDPE), linear low-density polyethylenes (LLDPE), metallocene copolymers of ethylene with at least one $C_3$-$C_8$ α-olefin (metallocene PE) and mixtures of at least two of said polymers.

6. The wrapper as claimed in claim 1, wherein the polymer component β) of the layer (a) of the polyolefin film consists of at least one LLDPE or of a mixture of LDPE and LLDPE or of a mixture of LDPE and metallocene PE, where the proportion of the LLDPE and, respectively, of the metallocene polyethylene is at least 15% by weight in the mixture and the melting point of the mixture is ≥113° C.

7. The wrapper as claimed in claim 6, wherein the tear-propagation resistance of the polyolefin film in machine direction is ≥0.18 N (measured in accordance with DIN 53356).

8. The wrapper as claimed in claim 1, wherein the optionally present surface layer (c) of the polyolefin film is composed of at least one polyethylene or ethylene copolymer, or a combination thereof, with at least one $C_3$-$C_8$ α-olefin.

9. The wrapper as claimed in claim 1, wherein the polyolefin film has a release coating (b) made of a UV-cured or thermally cured polysiloxane.

10. The wrapper as claimed in claim 1, wherein the shrinkage of the polyolefin film in MD and, respectively, CD measured in accordance with DIN 55543 for 100° C. and 1 min in the oil bath is ≤10%.

11. The wrapper as claimed in claim 1, wherein the wrapper is a peelable wrapper.

12. An individually packaged hygiene item packed in the wrapper as claimed in claim 11.

13. An individually packaged incontinence item, panty liner, or sanitary napkin packaged in the wrapper as claimed in claim 11.

14. A hygiene product with self-adhesive properties packaged in the wrapper as claimed in claim 11.

* * * * *